A. I. CARNINE.
VEHICLE BRAKE.
APPLICATION FILED APR. 16, 1910.
1,015,872.
Patented Jan. 30, 1912.
2 SHEETS—SHEET 2.
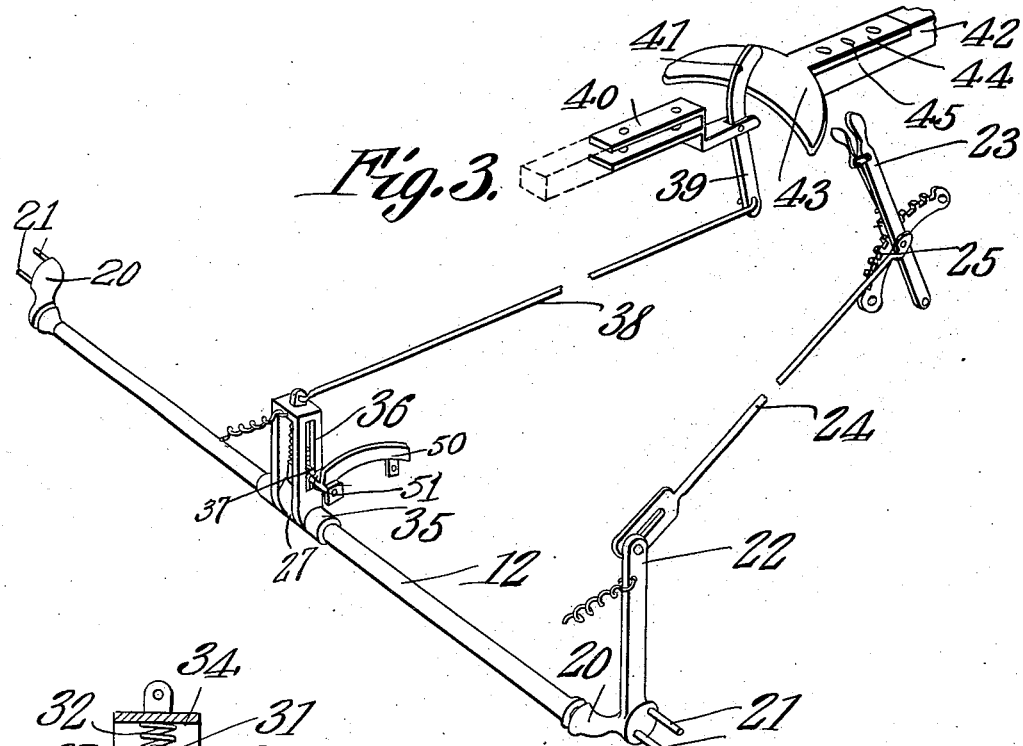
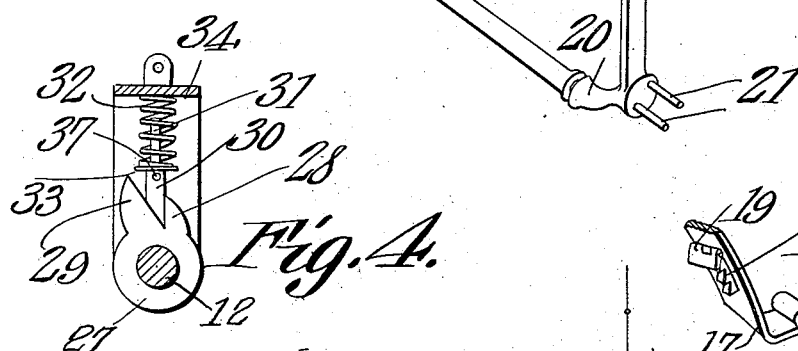
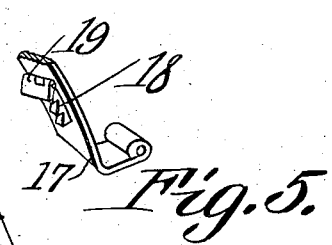
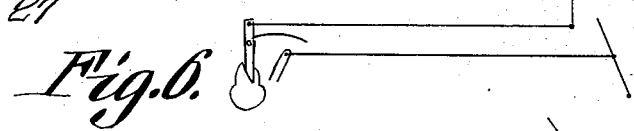
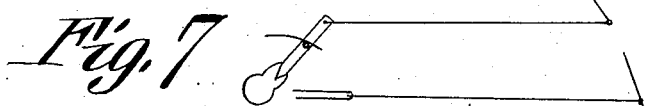
Inventor
Arba I. Carnine.
Witnesses
By C. A. Snow & Co.
Attorneys

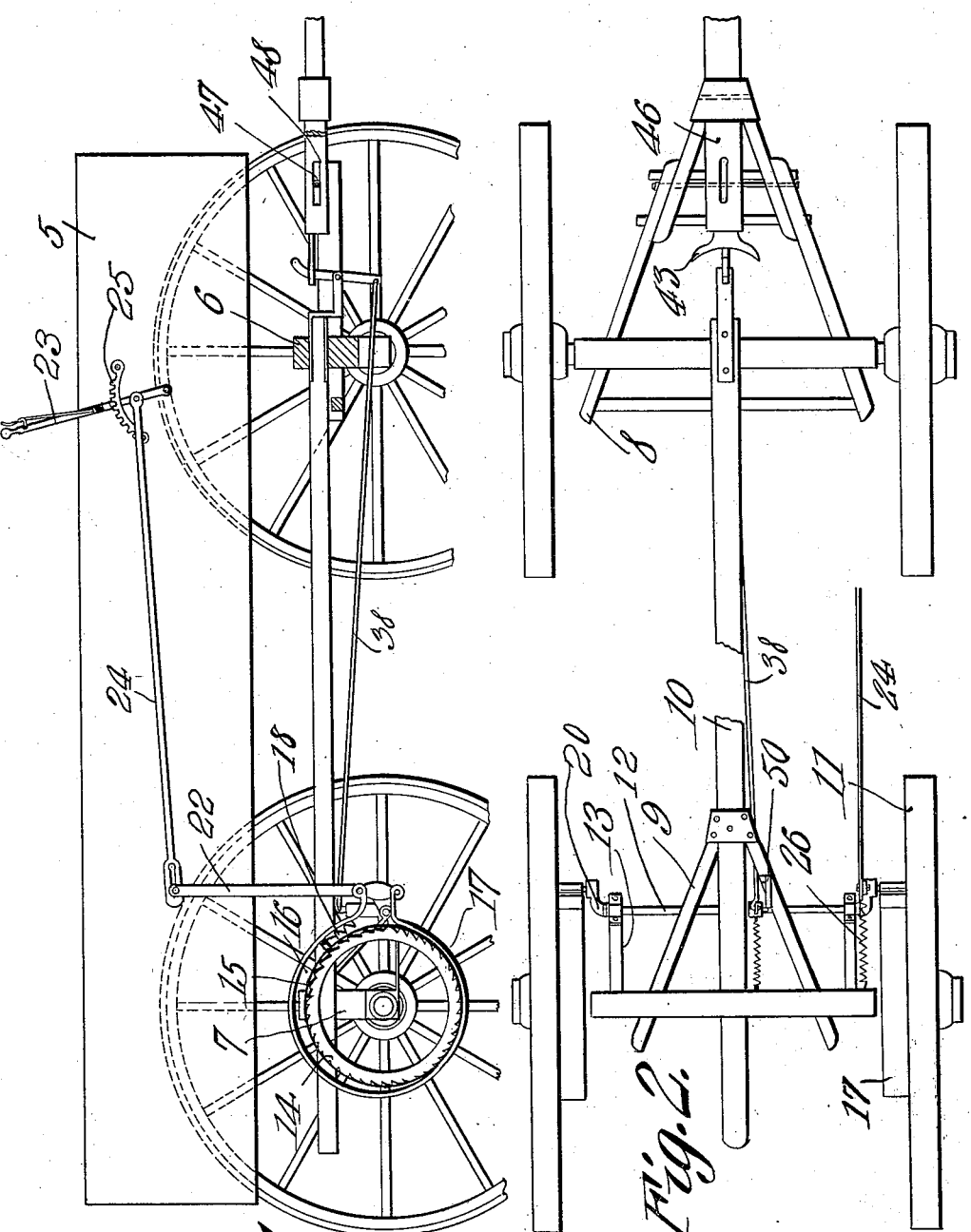

UNITED STATES PATENT OFFICE.

ARBA IRA CARNINE, OF FULLERTON, CALIFORNIA.

VEHICLE-BRAKE.

1,015,872.   Specification of Letters Patent.   Patented Jan. 30, 1912.

Application filed April 16, 1910. Serial No. 555,778.

*To all whom it may concern:*

Be it known that I, ARBA IRA CARNINE, a citizen of the United States, residing at Fullerton, in the county of Orange and State of California, have invented a new and useful Vehicle-Brake, of which the following is a specification.

It is the object of the present invention to provide an improved construction of vehicle brake and the invention aims primarily to provide a brake which will be automatically applied at the time of traveling down grade and the invention aims to provide a brake which will not only act automatically as stated, but which may be so manipulated as to permit backing of the vehicle without the brake being applied and also to permit of hand setting of the brake.

The invention aims further to so construct the brake as to assure of proper automatic setting thereof in traveling down grade, whether the tongue be in direct alinement with the reach of the vehicle or be at an angle with respect thereto.

The invention aims further to provide means for positively holding the vehicle against backward travel when for example, it is desired to rest the horses when ascending a grade.

With the above and other objects in view, the invention consists in the construction and arrangement of parts shown in the accompanying drawings in which,—

Figure 1 is a side elevation of a vehicle, parts being broken away or omitted, showing the brake embodying the present invention applied thereto. Fig. 2 is a top plan view of the bed frame of the vehicle, showing the brake in position thereon. Fig. 3 is a detail perspective view of the brake-mechanism removed from the vehicle frame. Fig. 4 is a detail vertical sectional view taken in a plane at right angles to the line of extent of the brake beam and illustrating the construction of the said beam and the arrangement of a clutch member thereon. Fig. 5 is a detail perspective view of one end of one of the brake bands. Fig. 6 is a diagrammatic view illustrating the parts in normal condition. Fig. 7 is a view similar to Fig. 6 but showing the positions assumed by the various parts of the brake when the same is automatically applied as for example in traveling down grade; and Fig. 8 is a similar view showing the positions assumed by the parts when the brake is manually applied or set.

The body of the vehicle is indicated in the drawings by the numeral 5 and the bed frame of the vehicle includes the usual front axle 6, rear axle 7, front hounds 8, rear hound 9, and reach 10. Mounted upon the rear axle 7 at the ends thereof are the usual wheels 11 and it is upon these wheels that the drums of the band brakes are to be mounted as will be presently described.

The brake mechanism embodying the present invention includes among other elements a brake beam which is indicated by the numeral 12 and is mounted for oscillatory movement in certain brackets 13 which are carried by the bolster for the rear axle 7. Secured in any suitable manner upon each rear wheel 11 of the vehicle is an annular brake drum 14 which is formed at its circumferential edge with a groove 15, the bottom wall of which is formed with ratchet teeth 16, it being understood that by forming the teeth in the bottom wall of the groove, they are not permitted to project beyond the true peripheral surface of the drum. Associated with each of the brake drums 14 is a brake band 17 the ends of which are operatively connected with the brake beam 12 in a manner which will presently be described.

Upon the inner face of each band 17 adjacent one end thereof there are formed several teeth which are indicated by the numeral 18, and these teeth project from the said surface of the band in such manner as to project into the grooves 15 in the drum and coöperate with the teeth 16 when the band is firmly tightened around the drum and the drums are rotated backwardly by the wheels. A lift plate 19 is pivoted upon the said surface of each brake band and one end of the series of the teeth thereon and when the band is tightened about the drum, and the wheels are rotating in a forward direction, this lift plate will bear frictionally against the true peripheral surface of the drum and will support that end of the band adjacent which it is located, in slightly spaced relation with respect to the drum so as to prevent the teeth 18 coming into contact with the teeth 16. When the wheels are rotating backwardly however this lift plate is thrown by reason of its frictional engagement with the peripheral surface of the drum, back upon its pivot so as to permit of the said end of the brake band more closely approaching the brake drum and thereby providing for engagement of the teeth 18 with the teeth 16 whereupon the rear wheels of the vehicle will be held against backward rotation. Thus it will be seen that when the bands are tightened about the drums while the vehicle is ascending a grade, the tendency toward backward movement of the vehicle will be arrested by the momentary backward rotation of the drum when the vehicle is stopped inasmuch as such rotation of the drums serves to swing the lift plate 19 upon its pivot as above described and allow the teeth 18 to positively engage with the teeth 16.

As illustrated in the drawings, the brake beam 12 at each end is offset as indicated by the numeral 20 and is provided at each offset end with a pair of pins 21 which have pivotal connection with the extremities of the respective brake bands 17, it being understood that when the brake beam is oscillated in one direction (in the present structure, forwardly) the bands will be tightened about the respective drums and that when the beam is rocked in the opposite direction, (backwardly) the bands will be loosened. In order that the brake beam may be oscillated, there is provided, in addition to the automatic means heretofore mentioned and to be presently specifically described, a manually operable means which is embodied in an upstanding crank arm 22 at one end of the brake beam, a hand lever 23 mounted at the forward end of the vehicle body 5, and a connecting rod 24 which at its forward end is pivotally connected with the lever and at its rear end has pin and slot connection with the upper end of the arm 22.

From the foregoing and from an inspection of the drawings and particularly Fig. 3 thereof, it will be readily understood that the brake beam 12 may be rocked forwardly by swinging the lever 23 forwardly and may be held against backward rocking movement by the hand operated pawl 24 and the segmental rack 25 shown in said Fig. 3 of the drawings. It will be understood however that the brake beam 12 may be rocked in a forward direction without affecting the lever 23 in any way whatsoever owing to the pin and slot connection had between the upper end of the arm 22 and the rear end of the connecting rod 24 between this arm and the hand lever. A spring 26 is connected at its forward end to the arm 22 adjacent the upper end thereof and at its rear end is connected to the bolster for the rear axle or to some other convenient part of the bed frame or the body of the vehicle and this spring tends to hold the arm 22 normally in a rearward direction and substantially vertical. It will be understood of course that whereas the lever 23 may not be employed in rearwardly rocking the brake beam, the spring 26 will perform this operation automatically as soon as the lever is released.

At a suitable point between its ends, the brake beam 12 is formed with an enlargement 27 having relatively angularly located projections, one of which is indicated by the numeral 28 and the other by the numeral 29. It will be observed from an inspection of Fig. 4 or the drawings, that the front and rear faces of the projections 28 and 29 respectively, are convexed or curved and that whereas the forward face of the projection 29 is substantially tangential to the enlargement 27, the rear face of the projection 28 is in a plane substantially radial with respect to the brake beam. It will also be observed that the rear and front faces of the projections 28 and 29, respectively, afford between them a notch for receiving the lower end of a pawl which is indicated by the numeral 30 and has a stem 31 upon which is arranged a spring 32 bearing at its lower end against a collar or other suitable stop 33 upon the pawl and at its upper end against the upper end of a housing 34 in which the pawl 30 is slidably mounted, the housing having sleeve portions 35 at its lower end which fit rotatably upon the beam 12.

It will be observed from an inspection of Fig. 3 of the drawings that one side wall of the housing is formed with a slot 36 and that the pawl 30 carries a pin 37 which projects through this slot and is arranged to work therein. Normally, the lower end of the pawl 30 seats in the notch afforded by the before mentioned faces of the projections 28 and 29 and the housing for the pawl is therefore held for oscillatory movement with the beam 12. This housing is of such length or height as to constitute, in effect, a lever, and the upper end thereof is connected to the rear end of a rod 38 which at its forward end is pivoted to the lower end of a rock arm 39 which is supported by a suitable bearing bracket 40 seated upon the forward end of the perch pole or reach of the vehicle. Above its fulcrum, the rocking arm 39 is curved forwardly, upwardly as indicated by the numeral 41, and secured upon the rear end of the tongue of the vehicle, the said tongue being indicated by the numeral 42, is a plate 43 having the general shape of a crescent and having projecting from its convex edge an attaching portion 44 through which and the said end of the tongue are passed securing bolts 45 serving to hold the plate upon the tongue. The concaved edge of the plate 43 is in this manner held presented toward the front end of the vehicle and more specifically it receives the curved upper end of the rock arm 41 and as a matter of fact the rock arm rests normally against said concave edge of the plate, and owing to the fact that this edge is curved in the arc of a circle, the tongue may assume numerous positions without bringing the plate out of operative engagement with the rock arm.

As will be observed from an inspection of Figs. 1 and 2 of the drawings, the rear end of the tongue is slidably mounted in a suitable box 46 supported upon the front hounds 8 of the vehicle and is limited in its sliding by the engagement of a bolt 47 carried thereby and engaging through slots 48 in the opposite sides of the box 46.

From the foregoing description of the invention it will be readily understood that as the vehicle is traveling down grade, the force exerted on the tongue in a backward direction will result in the upper end of the rock arm 39 being rocked rearwardly and its lower end forwardly whereby a pull will be exerted on the rod 38. As a result, the housing for the brake beam 12 will be correspondingly rocked and inasmuch as the pawl within the housing is in engagement in the notch afforded between the projections 28 and 29 and the rear face of the projection 28 is in a plane substantially radial with respect to the brake beam 12, forward rocking motion will be imparted to the said beam thereby serving to tighten the brake bands about their respective drums and thus retard the progress of the vehicle. It will equally as well be understood that the brake beam 12 may be rocked in the direction stated by means of the hand lever 23 so that the brakes may be applied manually when the vehicle is traveling along a comparatively level road surface. It is expedient that means be provided for rendering the automatic brake setting means inoperative when it is desired to merely back the vehicle and the means here provided is embodied in an arched casting 50 which is mounted upon the rear hounds, and has a flange 51 projecting in juxtaposition to the pin 37. As will be observed from an inspection of the diagrammatic views of the drawings, when the hand lever 23 is rocked in a forward direction, even but a short distance, the brake beam will be correspondingly oscillated, as heretofore stated and inasmuch as it may oscillate independently of the housing for the pawl 30, this pawl inclosed in the housing will remain in upright position although the pawl 30 will be lifted by the riding therebeneath of the projection 29 and will eventually ride over the projection. With the pawl in such position, should the team back, the rearward movement of the tongue would result in the usual forward swinging movement of the housing for the pawl, but owing to the location of the arched casting 50, the pin 37 of the pawl would ride over the flange 51 of the casting and the pawl would in this way be held against dropping into the notch between the projections 28 and 29 which would result in its shaft 12 being oscillated to such degree as to apply the brakes. As soon, however, as the vehicle has been backed and is again started forwardly a slight bit, the lever 23 may be rocked rearwardly whereby to release the arm 22 for like movement and the pin 37 will then ride back over the flange 51. After the brake beam 12 has been rocked rearwardly to a certain degree, the pawl 30 will again be in position for engagement in the notch, it being held out of such engagement however by the pin 37. Though out of actual engagement in the notch, should the vehicle be driven down grade and the tongue thereof be moved rearwardly, the housing 34 will rock forwardly allowing the pin 37 to spring over the end of the flange and ride therebeneath with the pawl 30 in engagement in the notch after which movement of the several parts the brakes would be effectually applied.

What is claimed is:—

1. A brake of the character described, including an oscillatory brake-beam, an oscillatory resiliently mounted retaining member, means intermediate said brake-beam and said retaining member, adapted to be engaged by said retaining member, when said beam is rocked in one direction to elevate said retaining member, means engageable by said retaining member, when the latter is elevated and rocked as indicated, and to operate said beam, and means for actuating said retaining member.

2. A brake of the character described, including an oscillatory brake-beam, an oscillatory resiliently mounted retaining member, means intermediate said brake-beam and said retaining member, adapted to be engaged by said retaining member when said beam is rocked in one direction, to elevate said retaining member, means engageable by said retaining member, when the latter is elevated and rocked as indicated, and to actuate said beam, and a tongue-actuated member having connection with said retaining member and adapted, as the tongue is moved rearwardly, to oscillate said retaining member for rocking said beam.

3. A brake of the character described, including an oscillatory brake-beam, an oscillatory resiliently mounted retaining member, means intermediate said brake-beam and said retaining member, adapted to be engaged by said retaining member when said beam is rocked in one direction to elevate said retaining member, means engageable by said retaining member when the latter is elevated and rocked as indicated, and to actuate said beam, a tongue-actuated member having connection with said retaining member and adapted, as the tongue is moved rearwardly, to oscillate said retaining member for rocking said beam and means operatively connected to said beam for its actuation.

4. In a brake of the class described, an oscillatory brake beam, a spring pressed pawl mounted upon the beam for oscillation thereon independently thereof and arranged to have positive engagement with the beam, the beam being provided with a portion engageable by the pawl when the beam is rocked in one direction whereby to raise this pawl, means with which the pawl is adapted to engage when so raised and rocked in one direction, and operate the beam; a tongue-actuated member having connection with the pawl whereby when the said tongue is moved rearwardly, the pawl upon the beam will be oscillated whereby to rock the beam, and hand-operated means operatively connected with the beam whereby the same may be operated.

5. In a brake of the class described, an oscillatory brake beam, a positive clutch member mounted upon the beam for oscillation thereon independently thereof, the clutch being adapted to have positive engagement with the beam, a tongue-actuated member having connection with the member upon the brake beam whereby when the said tongue is moved rearwardly, the member upon the beam will be oscillated whereby to rock the beam, said beam being formed with a portion engageable by the clutch member whereby to support the same out of position for positive engagement with the beam, and manually operable means for operating said beam.

6. In a brake of the class described, an oscillatory brake beam, a member mounted upon the beam for oscillation thereon independently thereof and arranged to have positive engagement with the beam, a member arranged in juxtaposition with respect to the beam and having an arcuate flange, the member upon the beam having a projecting portion adapted to engage with the flange whereby the said member will be supported out of position for positive engagement with the beam, the said beam being formed with a portion adapted to lift the said member when the beam is rocked in one direction, and manually operable means for so rocking the beam.

7. In a brake of the class described, an oscillatory brake beam, a wheel-carried brake drum, a brake band having operative connection at its ends with the brake beam, the brake drum being toothed, a tooth upon the brake drum whereby to prevent backward rotation of the drum with respect to the band, means upon the brake band to support the tooth out of engagement with the tooth upon the brake drum when the drum is rotating it forwardly, and a tongue-actuated member having connection with the member upon the brake beam, whereby when said tongue is moved rearwardly, the member upon the beam will be oscillated to thereby rock the tightened band about the brake drum.

In testimony that I claim the foregoing as my own, I have hereto affixed my signature in the presence of two witnesses.

ARBA IRA CARNINE.

Witnesses:
RICHARD MELROSE,
H. G. AMES.